(12) United States Patent
Kadar-Kallen

(10) Patent No.: US 8,085,472 B2
(45) Date of Patent: Dec. 27, 2011

(54) EXPANDED BEAM INTERFACE DEVICE AND METHOD FOR FABRICATING SAME

(75) Inventor: Michael Aaron Kadar-Kallen, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 127 days.

(21) Appl. No.: 12/607,513

(22) Filed: Oct. 28, 2009

(65) Prior Publication Data

US 2011/0096404 A1    Apr. 28, 2011

(51) Int. Cl.
G02B 9/00 (2006.01)
G02B 6/36 (2006.01)
(52) U.S. Cl. .............................. 359/652; 385/88; 385/93
(58) Field of Classification Search ........... 359/652–655
See application file for complete search history.

(56) References Cited

U.S. PATENT DOCUMENTS

| | | | | |
|---|---|---|---|---|
| 4,753,510 A * | 6/1988 | Sezerman | | 385/61 |
| 5,644,122 A | 7/1997 | Siegenthaler et al. | | |
| 5,760,852 A * | 6/1998 | Wu et al. | | 349/14 |
| 5,995,294 A * | 11/1999 | West | | 359/642 |
| 6,480,650 B2 * | 11/2002 | Firth et al. | | 385/34 |
| 6,643,071 B2 * | 11/2003 | Schnitzer | | 359/653 |
| 6,776,537 B2 * | 8/2004 | Toyama | | 385/93 |
| 6,913,402 B2 | 7/2005 | Bohlin et al. | | |
| 7,031,567 B2 * | 4/2006 | Grinderslev et al. | | 385/34 |
| 2008/0131052 A1 | 6/2008 | Matsumura et al. | | |
| 2009/0046979 A1 | 2/2009 | Zhou et al. | | |
| 2010/0027943 A1 * | 2/2010 | Armani et al. | | 385/74 |

FOREIGN PATENT DOCUMENTS

EP        0 774 669        5/1997
WO    WO 2005/114283    12/2005

OTHER PUBLICATIONS

International Search Report, International Application No. PCT/US2010/002783, International Filing Date Oct. 19, 2010.

* cited by examiner

*Primary Examiner* — Jordan Schwartz

(57) ABSTRACT

An optoelectronic device comprising a gradient index lens having an optical length, L, wherein $L = P/4 + NP/2$, where N is an integer equal to or greater than 0 and P is the pitch of the gradient index lens. If the desired focus spot is spaced from the end face of the gradient index lens, the optical length L can be adjusted accordingly as a function of that distance and the index of refraction of the medium occupying that distance.

16 Claims, 3 Drawing Sheets though the optical signal from getting through the connector. Accordingly, it is well known to use expanded beam connectors in situations where it is likely that connections will be made in the field, and particularly in rugged or dusty environments, such as are frequently encountered in military and industrial applications.

EXPANDED BEAM INTERFACE DEVICE AND METHOD FOR FABRICATING SAME

FIELD OF TECHNOLOGY

The invention pertains to optoelectronics. More particularly, the invention is particularly useful in connection with expanded beam optoelectronic connectors.

BACKGROUND

It is typically the case that an optical signal transported on an optical fiber must be coupled from that fiber to or from another optical fiber or an electronic device. Typically, the end of the optical fiber is outfitted with an optical connector of a given form factor, which connector can be coupled to a mating optical connector on the other fiber or optoelectronic device. The optoelectronic device may be an optical-to-electrical converting device or an electrical-to-optical converting device. For instance, it is well known that optical signals are an extremely efficient method for transmitting data between two electronic devices. However, that optical data must be converted from electrical signals to optical signals at the transmitting device and then from optical signals back to electrical signals at the receiving device. Thus, optical signals usually start as digital electronic signals that are converted into optical pulses by an optical-to-electrical optoelectronic sub-assembly, typically, comprising at least a laser or LED that converts electrical signals to optical signals. Then, the optical signals are transmitted. The optical signals are received at a receiving device at the receiving end. The receiving device typically includes an optical-to-electrical optoelectronic sub-assembly having at least an optical detector, such as a photodiode, for converting optical input signals into electrical output signals.

It is well known in the optoelectronic arts to provide connectors with the optoelectronic sub-assemblies (either receiving or transmitting) incorporated directly in the connector.

These connectors generally must be fabricated extremely precisely in order to ensure that as much light as possible is transmitted through the connector. In a typical optical fiber, the light is generally contained only within the core of the fiber, which typically may be about 10 microns in diameter for a single-mode fiber or about 50 microns in diameter for a multi-mode fiber. A speck of dust typically is greater than 10 microns in cross section. Accordingly, a single speck of dust at the interface of two connectors can substantially or even fully block the optical signal from getting through the connector. Accordingly, it is well known to use expanded beam connectors in situations where it is likely that connections will be made in the field, and particularly in rugged or dusty environments, such as are frequently encountered in military and industrial applications.

Expanded beam connectors include optics that expand the beam so as to increase the beam's cross section at the optical interface of the connector (i.e., the end of the connector that is designed to be connected to another optical connector or optoelectronic device). Depending, of course, on the direction of light travel through the connector, an expanded beam connector may expand an input beam to a greater cross section and/or receive an input expanded beam and focus it to a smaller cross section. In theory, the expanded beam cross section is large enough so that dust particles will not substantially reduce the amount of light coupling between the mating connectors.

U.S. Pat. No. 6,913,402 discloses an expanded beam optical connector with a built-in optoelectronic sub-assembly as illustrated in FIG. 1. This connector 100 includes a ball lens 101 and a fiber 102 contained within a ferrule 103 positioned between the optical interface surface 111 and the optoelectronic sub-assembly 104. Using a receiving optical-to-electrical sub-assembly as an example, collimated light 113 entering the connector 100 at the optical interface surface 111 enters the ball lens 101 and is focused on the input end face 115 of the fiber 102. The other end face of the fiber 102 is in contact with an optical input 106 of an optoelectronic sub-assembly 104. The optoelectronic sub-assembly 104 outputs digital electrical signals on one or more electrical lines 107 corresponding to the optical signals striking the detector surface.

While the device of FIG. 1 is effective at focusing an expanded beam or vice versa, it is difficult and expensive to manufacture. Particularly, it comprises several optical pieces including a ball lens, an optical fiber, a ferrule, a housing, and an Optical Sub-Assembly, all of which must be assembled together precisely.

SUMMARY

The invention pertains to an expanded beam optical coupling comprising a gradient index lens having an optical length, L, wherein L is approximately P/4+NP/2, where N is an integer and P is the pitch of the gradient index lens. This length will focus a collimated input light beam striking the input endface of the gradient index lens to a spot at the other endface of the lens, or expand a point light beam striking one endface of the gradient index lens to an expanded collimated beam output from the other endface of the lens. If it is desired to focus an expanded beam to a point that is not coplanar with an endface of the gradient index under lens, then the length of the lens may be adjusted from P/4+NP/2 accordingly. For instance, if the desired point of focus is separated by a non-zero distance, D, from the end face of the gradient index lens, the optical length L of the gradient index lens may be shortened accordingly as a function of distance, D, and the index of refraction of the medium occupying that distance relative to the index of refraction of the lens.

The invention may be used in expanded beam connectors, including optical-to-optical connectors and optoelectronic connectors with built-in optoelectronic sub-assemblies, such as optical-to-electrical sub-assemblies and electrical-to-optical sub-assemblies.

DETAILED DESCRIPTION OF EMBODIMENTS

Figure 2:
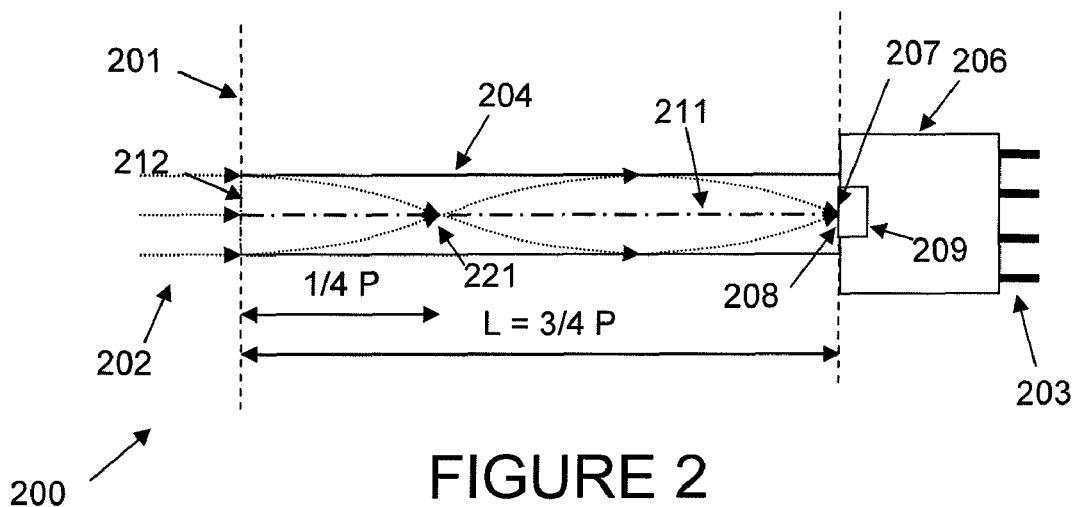
FIG. 2 illustrates an expanded beam optoelectronic connector in accordance with a first embodiment.

FIG. 2 illustrates the principles of the present invention as applied to an expanded beam optoelectronic connector, such as a bulkhead connector, incorporating an optoelectronic sub-assembly. This exemplary embodiment demonstrates an optoelectronic connector that receives optical signals in an expanded beam as an input, focuses that light onto a light detector surface of an optical-to-electrical optoelectronic sub-assembly, and outputs electrical signals. However, this is merely exemplary. The same principles can be applied in substantially the same configuration to expand a beam, such as in an electrical-to-optical optoelectronic connector. Furthermore, the principles of the invention are not limited to use in connectors for converting between electrical and optical. The same principles may be employed in optical-to-optical expanded beam connections without an optoelectronic sub-assembly. Even furthermore, the principles of the invention are not even limited to use in connectors per se, but have applicability anywhere it is desired to expand or contract a collimated light beam.

In any event, in the exemplary embodiment of FIG. 2, the connector 200 comprises a surface 201 upon which incident light 202 impinges. The surface 201 may, for instance, comprise the endface of an optical connector. This surface 201 comprises or abuts an endface 212 of a radial gradient index (GRIN) lens 204. The opposing endface 208 of the gradient index lens 204 abuts an optical input 207 of an optical detector 209 of an optical-to-electrical sub-assembly 206. The optical-to-electrical sub-assembly 206 may be any conventional optical-to-electrical sub-assembly.

The optical-to-electrical sub-assembly 206 converts the light signals into electrical signals which are output on one or more electrical lines 203 to an electronic apparatus to which the connector 200 may be electrically coupled.

Figure 3:
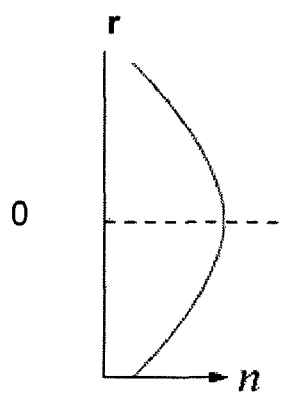
FIG. 3 is a graph illustrating a gradient index of refraction of an exemplary gradient index lens.

Gradient index lens 204 is a cylindrical radial gradient index lens. The index of refraction of a radial gradient index lens varies as a function of the radial distance r from the central longitudinal axis 211 of the cylindrical lens. The refractive index profile of a radial GRIN lens may be expressed as:

$$n(r) = n_0\left(1 - \frac{A}{2}r^2\right),$$

where $n_0$ is the index of refraction on the central axis 211 of the lens, n(r) is the refractive index at a distance r from the axis 211 of the GRIN lens, r is the distance from the optical axis 211, and A is the square of the gradient-index constant of the lens (i.e., the gradient-index constant of the lens is $\sqrt{A}$). A is a constant that essentially defines the change in the index of refraction as a function of the radial distance from the central axis 211. Both $n_0$ and A are constants for a given GRIN lens. Commonly, although not necessarily, the index of refraction, n, varies parabollically as a function of distance, r, from axis 211. FIG. 3 shows an exemplary plot of the index of refraction, as a function of the distance, r, from the central axis for a typical parabolic GRIN lens.

Figure 4:
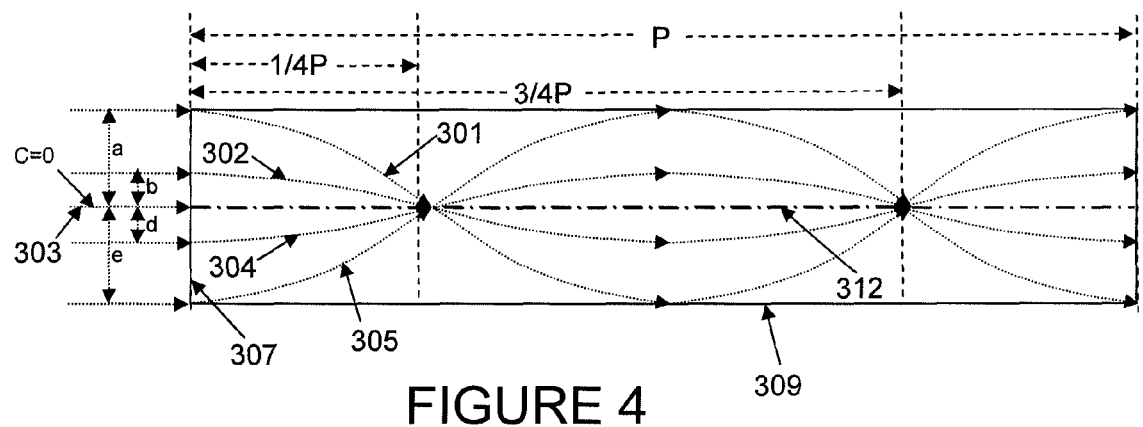
FIG. 4 is a diagram illustrating exemplary paths of collimated light beams in a gradient index lens.

As illustrated in FIG. 4, collimated light entering a GRIN lens travels over an approximately sinusoidal path through the lens, with the "amplitude" of the sinusoid being a function of the distance, r, from the central longitudinal axis at which the light strikes the lens.

The "period" of the sinusoidal path of light within the GRIN lens is known as the "pitch", P, of the GRIN lens and is related to the gradient-index constant by the relationship:

$P=2\pi/\sqrt{A}$.

FIG. 4 shows the path of five exemplary parallel light beams 301, 302, 303, 304, 305 that strike the endface 307 of an ideal GRIN lens 309 perpendicular to the endface. Each beam travels over a sinusoidal path having the same pitch, P.

However, each path has a different "amplitude" as dictated by the radial distance, a, b, c, d, or e, from the central axis 312 of the lens at which the beam struck the endface 307. Accordingly, as can readily be seen in FIG. 4, all of the light from all of the parallel beams 301, 302, 303, 304, 305 is focused to a single point at one quarter of a pitch (¼) P from the endface 307 and then again every half pitch (½)P thereafter, e.g., ¾P, 5/4P, 7/4P. This relationship may be expressed as:

Focus spots=P/4+N(P/2), where N is an integer equal to or greater than 0.

Those spots are on the central axis 312 of the lens 309 assuming the light strikes the lens endface perpendicular thereto.

Thus, a "quarter pitch" GRIN lens (length L=P/4) would take light from a collimated source and focus it to a point on the endface of the lens. A "half-pitch" GRIN lens would take light from a point and image it back to a point that is displaced by a distance L=P/2.

Returning to FIG. 2, the GRIN lens 204 in that Figure has an optical length of (¾)P, i.e., it is a ¾-pitch GRIN lens, which takes collimated light, focuses it to a point 221, and then images that point to the other endface of the lens (which is coplanar with the optical input 207 of the optical/electrical sub-assembly 206).

Figure 5:
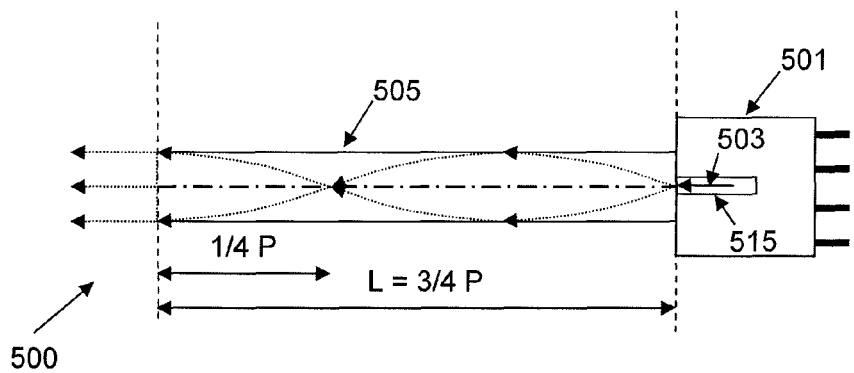
FIG. 5 illustrates an expanded beam optoelectronic connector in accordance with a second embodiment.

FIG. 5 shows an equivalent connector 500 except with an electrical-to-optical sub-assembly 501 for expanding and transmitting a beam, rather than an optical-to-electrical sub-assembly for receiving and focusing a beam of light. In this expanding, transmitting embodiment, light 503 enters the ¾ pitch GRIN lens 505 at a small spot such as the output of a laser 515 and is expanded and collimated when it exits GRIN the lens 505 at the opposite endface. Hence, a ¾ pitch GRIN lens can convert light emitted from a small spot to an expanded, collimated beam and/or focus an expanded, collimated beam to a small spot using a single optical element (i.e., a GRIN lens). This is greatly simplified, for instance, as compared to the prior art expanded beam connector illustrated in FIG. 1.

A variation of this design has a length, L, of $L=P/4+NP/2$, where N is an integer equal to or greater than 0. The first term in this equation, P/4, expresses the fact that the GRIN lens takes a collimated light beam and images it to a point (or vice versa) that is one quarter of a wavelength from the input lens face. The second term, NP/2, represents the transfer of the focused image along the axis of the GRIN lens every half pitch. In the real world, as N increases, the imaged spot will likely become more blurred. Hence, there is a practical upper limit on the value of N, which limit will depend on various parameters, including the quality of the GRIN lens and the quality of the input light.

The gradient-index constant ($\sqrt{A}$), the index of refraction on the central axis of the lens ($n_0$), and/or the integer N in the equation above may be adjusted to provide an effective focal length of virtually any desired distance that may be dictated by any application, form factor, or other consideration. Optical modeling software, such as ZEMAX available from Zemax Development Corporation of Bellevue, Wash., USA, can be used to predict the quality of the image and refine the design to optimize performance.

The embodiments described heretofore have been based on an assumption that the spot to which the collimated light is to be focused (in a focusing application) is coplanar with the endface of the GRIN lens. However, this may not always be the case. There may be applications in which the spot to which it is desired to focus the light is displaced from the endface of the lens. Most likely, in such cases, the desired focus spot will be outside of the lens, although there may be applications in which it is desired to focus to a spot within the body of the lens.

Figure 6:
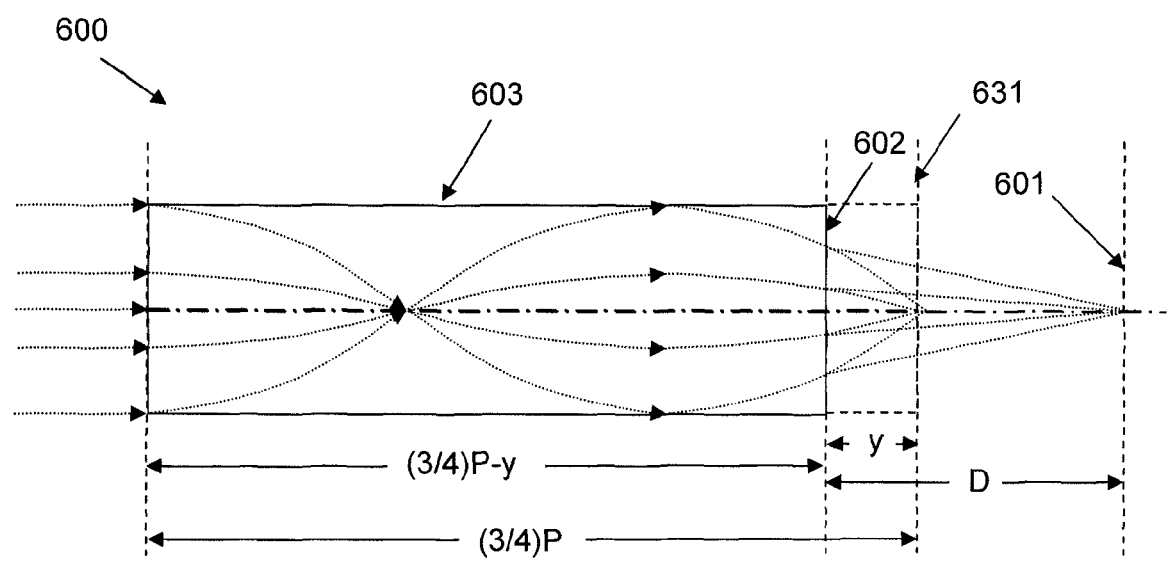
FIG. 6 illustrates an expanded beam optoelectronic connector in accordance with a third embodiment.

For instance, with reference to FIG. 6, in an optical-to-electrical converting optoelectronic connector 600, the detector surface 601 may be displaced a distance, D, from the endface 602 of the GRIN lens 603. Accordingly, then the GRIN lens would be designed to have a length slightly less than P/4+NP/2 so that the focus spot will be displaced the desired distance, D, from the endface of the lens. Typically, the space between the endface of the GRIN lens and the detector surface will be occupied by one or more different mediums, such as air, vacuum, or another medium, having a different index of refraction than the GRIN lens 603. The length of the GRIN lens would be selected so as to account for any change in the index of refraction at the junction between the GRIN lens and the medium between the GRIN lens and the focus spot. In such a case, the desired length, L, of the GRIN lens can be mathematically expressed as:

$$L = P/4 + NP/2 - y$$

where y is a distance selected to cause a collimated light beam entering the first end face of the gradient index lens to be focused the distance D from the second end face of the gradient index lens. Note that, while the distance y has been described in the sentence above in language descriptive of a receiving system, such an adjustment in the length of the GRIN lens also is applicable to transmitting configurations. It is merely a way to describe the change in length that can be made, and is not intended to imply that it only is applicable to receiving configurations.

For comparative purposes, FIG. 6 shows the path of the light and focus spot both for (1) a GRIN lens of length L=(¾)P−y and (2) a GRIN lens of length L=(¾)P (as represented by phantom endface 631). As can be seen, the distance, D, between the endface of the GRIN lens and the focal point is not the same as the lens adjustment distance, y, because of the differences in index of refraction of the GRIN lens 603 and the index of refraction of the medium in the space between the GRIN lens and the surface 601. The length y by which the GRIN lens is shortened will generally be less than (¼)P. For instance, if it is assumed that there is only one medium between GRIN lens end face 602 and desired focal point 601 and that medium has an index of refraction of $n_m$, then, at least ideally, the distance y may be expressed as:

$$y = \frac{P}{2\pi} \arctan\left(D \frac{2\pi n_0}{P n_m}\right)$$

where all the other terms are as defined in previous equations (particularly, P is the pitch of the GRIN lens and $n_0$ is the index of refraction of the GRIN lens on its central longitudinal axis). Even the results of this equation would likely need to be further optimized using optical modeling software, such as ZEMAX.

For systems in which the light is being expanded (e.g. travelling in the opposite direction from that illustrated in FIG. 6), it is expected that generally it will be desired that the light exit the opposite endface as collimated light. Accordingly, it generally will not be necessary to adjust the length of the GRIN lens from P/4+NP/2 when the apparatus is being used to expand a collimated light beam. However, there certainly may be expanding applications in which the length of the GRIN lens also may intentionally be altered from P/4+NP/2. Such situations may occur, for instance, when the input light is not collimated or when it is desired that the output light not be collimated, but rather be an expanding beam. In other cases, the designer may intentionally detune a system to increase attenuation or to increase the tolerance to angular misalignment.

Figure 1:
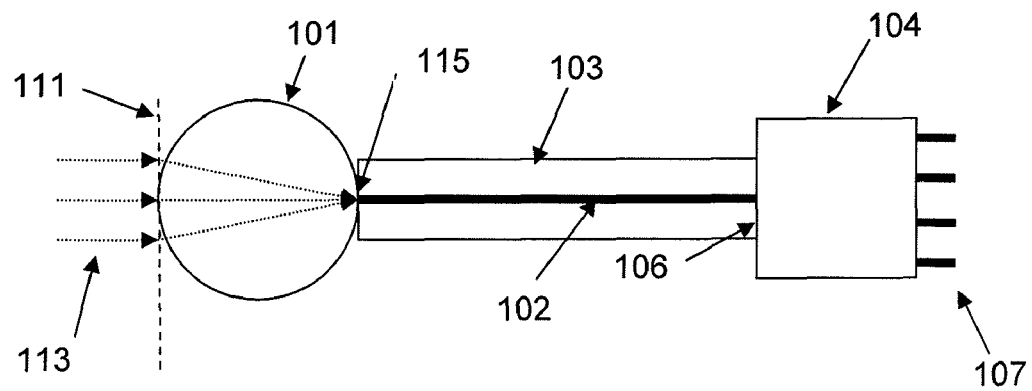
FIG. 1 illustrates an expanded beam optoelectronic connector of the prior art.

Another advantage of the present invention is that the support structure for the optical elements is simpler. Specifically, in prior art systems such as illustrated in FIG. 1, the support structure must maintain a highly precise alignment between the lens and the ferrule, whereas the present invention has no such requirement.

The principles of the present invention as herein described also can be applied to construct a converter for converting from an expanded beam connector to a single fiber connector or vice versa. In such an embodiment, the optical sub-assemblies of the various figures may be replaced with a ferrule of an optical connector.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. An optoelectronic device comprising:
   a surface upon which light is to be focused to a spot; and
   a gradient index lens having an optical length, L, between first and second longitudinal end faces of the gradient index lens, the second end face positioned to couple light between the gradient index lens and the spot, the spot being a non-zero distance D from the second end face of the gradient index lens wherein $$L = P/4 + NP/2,$$

where N is an integer,
   P is a pitch of the gradient index lens, and
   y is a distance selected to cause a collimated light beam entering the first end face of the gradient index lens to be focused the distance D from the second end face of the gradient index lens.

2. The device of claim 1 wherein y is less than P/4.

3. The device of claim 2 further comprising a medium between the second end face of the gradient index lens and the spot, the medium having an index of refraction $n_m$ wherein $$y = \frac{P}{2\pi} \arctan\left(D \frac{2\pi n_0}{P n_m}\right)$$

wherein
   D is the distance between the distance between the second end face of the gradient index lens and the spot,
   P is a pitch of the gradient index lens, and
   $n_0$ is the index of refraction on a central longitudinal axis of the gradient index lens.

4. The device of claim 3 wherein L=(¾)P.

5. The device of claim 3 wherein $$P = \frac{2\pi}{\sqrt{A}} \text{ where } n_r = n_0\left(1 - \frac{A}{2}r^2\right)$$

and $n_r$=the refractive index at a distance r from an optical axis of the gradient index lens, and r=a distance from the optical axis of the gradient index lens.

6. The device of claim 3 wherein the spot is on a detection surface of an optoelectronic sub-assembly.

7. The device of claim 6 wherein the optoelectronic sub-assembly transmits light into the gradient index lens.

8. The device of claim 6 wherein the optoelectronic sub-assembly receives light from the gradient index lens.

9. The device of claim 3 wherein the device is an expanded beam connector.

10. The device of claim 9 wherein the device is a bulkhead connector.

11. The device of claim 3 wherein the device is a converter between an expanded beam connector and a single fiber connector.

12. A method of designing an expanded beam connector comprising:
    determining a non-zero distance D between a focus spot and an endface of a lens that can focus light at the spot in a connector; and
    placing in the connector a gradient index lens having an optical length, L, between first and second longitudinal end faces of the gradient index lens, wherein $L=P/4+NP/2$, where N is an integer,
    P is a pitch of the gradient index lens, and
    y is a distance selected to cause a collimated light beam entering the first end face of the gradient index lens to be focused the distance D from the second end face of the gradient index lens.

13. The method of claim 12 wherein:

$$y = \frac{P}{2\pi}\arctan\left(D\frac{2\pi n_0}{Pn_m}\right)$$

wherein
D is the distance between the second end face of the gradient index lens and the spot,
P is a pitch of the gradient index lens,
$n_m$ is the index of refraction of a medium between the lens and the spot, and
$n_0$ is the index of refraction on a central longitudinal axis of the gradient index lens.

14. The method of claim 12 wherein L=(¾)P.

15. The device of claim 9 wherein the expanded beam connector is an optical-to-optical connector.

16. The device of claim 9 wherein the expanded beam connector is an optical-to-electrical connector.

* * * * *